United States Patent
Jeong

(10) Patent No.: US 7,529,083 B2
(45) Date of Patent: May 5, 2009

(54) SUPPORTING APPARATUS AND MONITOR APPARATUS WITH THE SAME

(75) Inventor: Jun-su Jeong, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 246 days.

(21) Appl. No.: 11/132,269

(22) Filed: May 19, 2005

(65) Prior Publication Data
US 2005/0258319 A1 Nov. 24, 2005

(30) Foreign Application Priority Data
May 21, 2004 (KR) ........................ 10-2004-0036499

(51) Int. Cl.
*G06F 1/16* (2006.01)
(52) U.S. Cl. ..................... 361/681; 600/407; 248/917
(58) Field of Classification Search ............ 248/288.31, 248/288.51, 917–924; 600/407; 361/679–687, 361/724–727
See application file for complete search history.

(56) References Cited

U.S. PATENT DOCUMENTS

| | | | |
|---|---|---|---|
| 5,904,328 A | 5/1999 | Leveridge et al. | |
| RE36,978 E | 12/2000 | Moscovitch | |
| 6,554,238 B1 * | 4/2003 | Hibberd ................ | 248/278.1 |
| 2004/0035987 A1 * | 2/2004 | Oddsen, Jr. ............ | 248/121 |
| 2005/0288571 A1 * | 12/2005 | Perkins et al. ........... | 600/407 |

FOREIGN PATENT DOCUMENTS

| | | |
|---|---|---|
| JP | 10-222091 | 8/1998 |
| JP | 11-231809 | 8/1999 |
| JP | 2000-187446 | 4/2000 |
| KR | 1999-15738 | 3/1999 |
| KR | 2000-39480 | 7/2000 |
| KR | 2001056960 A * | 7/2001 |
| KR | 2003-57686 | 7/2003 |

OTHER PUBLICATIONS

PCT Search Report issued on Apr. 27, 2005, for PCT/KR2005/000068.
Korean Office Action issued Dec. 6, 2005 in Korean Patent Application No. 2004-36499.

* cited by examiner

*Primary Examiner*—Hung V Duong
(74) *Attorney, Agent, or Firm*—Stanzione & Kim, LLP

(57) ABSTRACT

A monitor apparatus includes at least one pair of monitor main bodies to display a picture, a stand to support the monitor main bodies with respect to an installation surface, at least one pair of supporting arms provided between the monitor main bodies and the stand to support the monitor main bodies with respect to the stand, a first hinge provided between the stand and each supporting arm to swivelly couple the supporting arm to the stand, and a second hinge provided between each monitor main body and each supporting arm to swivelly couple the monitor main body to the supporting arm. In the monitor apparatus, the monitor main body can rotate not only near to a user but also at various angles.

50 Claims, 13 Drawing Sheets

SUPPORTING APPARATUS AND MONITOR APPARATUS WITH THE SAME

CROSS-REFERENCE TO RELATED APPLICATIONS

This application claims the benefit of Korean Patent Application No. 2004-36499, filed on May 21, 2004, in the Korean Intellectual Property Office, the disclosure of which is incorporated herein by reference in its entirety.

BACKGROUND OF THE INVENTION

1. Field of the Invention

The present general inventive concept relates to a monitor apparatus, and more particularly, to a monitor apparatus comprising at least one pair of monitor main bodies independently mounted on a standing unit to rotate at various angles.

2. Description of the Related Art

Generally, a monitor apparatus comprises a monitor main body displaying a picture, and a base seated on an installation surface, such as a table, and supporting the monitor main body. Here, the monitor apparatus includes all apparatuses which can display a picture like a television, a monitor for a computer, etc.

Recently, the monitor main body comprises a thin display panel, such as a liquid crystal monitor (LCD), a plasma monitor panel (PDP), etc.

FIG. 1 is a perspective view of a conventional monitor apparatus. As shown in FIG. 1, the conventional monitor apparatus comprises a pair of monitor main bodies 110 each having a display panel 111, a base 121 seated on an installation surface, such as a table, a stand 123 standing on the base 121 and supporting the monitor main body 110, a hinge 150 provided between the monitor main body 110 and the stand 123 and allowing the monitor main body 110 to swivel about the base 121.

The hinge 150 supports the pair of monitor main bodies 110 to swivel with respect to a vertical axis of the stand 123. Thus, the pair of monitor main bodies 110 can swivel with respect to the hinge 150 (in directions of arrows of FIG. 1).

However, in the conventional monitor apparatus, the pair of monitor main bodies are allowed to only swivel about the stand, so that it is inconvenient for a user. Thus, the conventional monitor apparatus is needs to be improved structure to allow the monitor main body to rotate not only near to a user but also at various angles.

SUMMARY OF THE INVENTION

In order to solve the foregoing and/or other problems, it is an aspect of the present general inventive concept to provide a monitor apparatus comprising at least one pair of monitor main bodies, in which the monitor main body can rotate not only near to a user but also at various angles.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a monitor apparatus comprising at least one pair of monitor main bodies to display a picture, a stand to support the monitor main bodies with respect to an installation surface, at least one pair of supporting arms provided between the monitor main bodies and the stand to support the monitor main bodies with respect to the stand, a first hinge provided between the stand and each supporting arm to swivelly couple the supporting arm to the stand, and a second hinge provided between each monitor main body and each supporting arm to swivelly couple the monitor main body to the supporting arm.

According to an aspect of the present general inventive concept, the supporting arm may comprise a first arm coupled to the first hinge, and a second arm coupled to the second hinge and detachably connected to the first arm.

According to another aspect of the present general inventive concept, one of the first and second arms can be provided with a connecting projection, and the other one of the first and second arms can be provided with a projection holder.

According to yet another aspect of the present general inventive concept, the connecting projection can be connected to and separated from the projection holder in a lengthwise direction of the supporting arm, and the projection holder can be provided with a locking unit to be locked into and released from the connecting projection.

According to still another aspect of the present general inventive concept, the monitor apparatus may further comprise one or more cables connecting the monitor main body embedded in the first hinge, the supporting arm, and the second hinge to connect the monitor main body to the stand.

According to another aspect of the present general inventive concept, the cables can be embedded in the first arm and the second arm to connect the monitor main body to the stand, and respective ends of the first and second arms to be connected to each other are provided with connection terminals that are connected to corresponding ones of the one or more cables to connect the cables to each other when the first and second arms are connected.

According to another aspect of the present general inventive concept, the first hinge may comprise a hinge shaft to rotatably couple the supporting arm to the stand along a vertical axis.

According to another aspect of the present general inventive concept, the hinge shaft can have a shape like a hollow cylinder through which the one or more cables extended from the supporting arm to the stand pass.

According to another aspect of the present general inventive concept, the second hinge may comprise a swiveling bracket coupled to the monitor main body, and a swiveling shaft to couple the supporting arm to the swiveling bracket along the vertical axis and to be swivelly coupled to at least one of the supporting arm and the swiveling bracket.

According to another aspect of the present general inventive concept, the swiveling shaft can have a shape like a hollow cylinder through which the one or more cables extended from the monitor main body to the supporting arm pass.

According to another aspect of the present general inventive concept, the second hinge can tiltably couple the monitor main body to the supporting arm.

According to another aspect of the present general inventive concept, the second hinge may comprise a first tilting bracket coupled to the monitor main body, a second tilting bracket coupled to the supporting arm, and a tilting shaft to couple the first tilting bracket to the second tilting bracket along a left and right direction axis, and the tilting shaft tiltably coupled to at least one of the first tilting bracket and the second tilting bracket.

According to another aspect of the present general inventive concept, the second hinge may further comprise a tilting angle restricting part to restrict a tilting angle of the first tilting bracket relative to the second tilting bracket.

According to another aspect of the present general inventive concept, the monitor main body can be pivotally coupled to the supporting arm.

According to another aspect of the present general inventive concept, the second hinge may comprise a pivoting bracket coupled to the monitor main body, and a pivoting shaft to pivotally couple the pivoting bracket with the supporting arm along a back and forth direction axis.

According to another aspect of the present general inventive concept, the pivoting shaft can have a shape like a hollow cylinder through which the one or more cables extended from the monitor main body to the supporting arm pass.

According to another aspect of the present general inventive concept, the second hinge may comprise a pivoting bracket coupled to the monitor main body, and a pivoting shaft to pivotally couple the pivoting bracket to the supporting arm along the back and forth direction axis.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
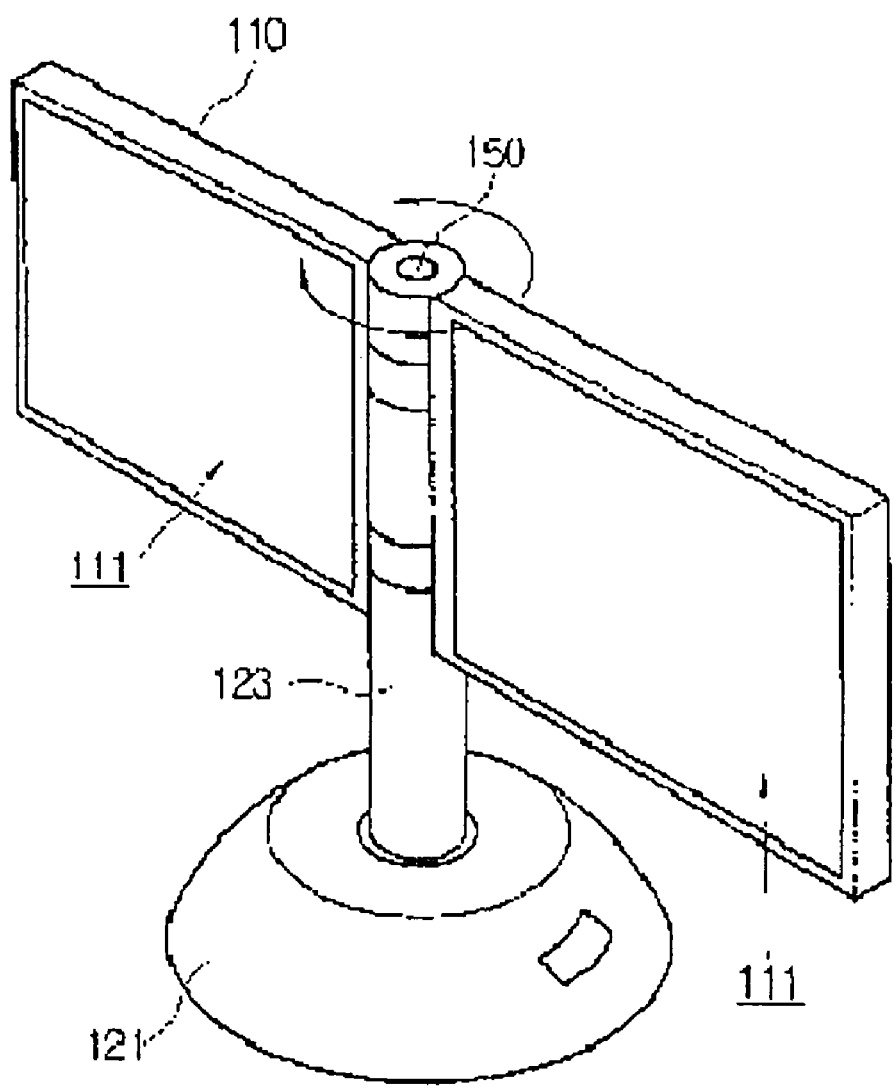
FIG. 1 is a perspective view illustrating a conventional monitor apparatus.
Figure 2:
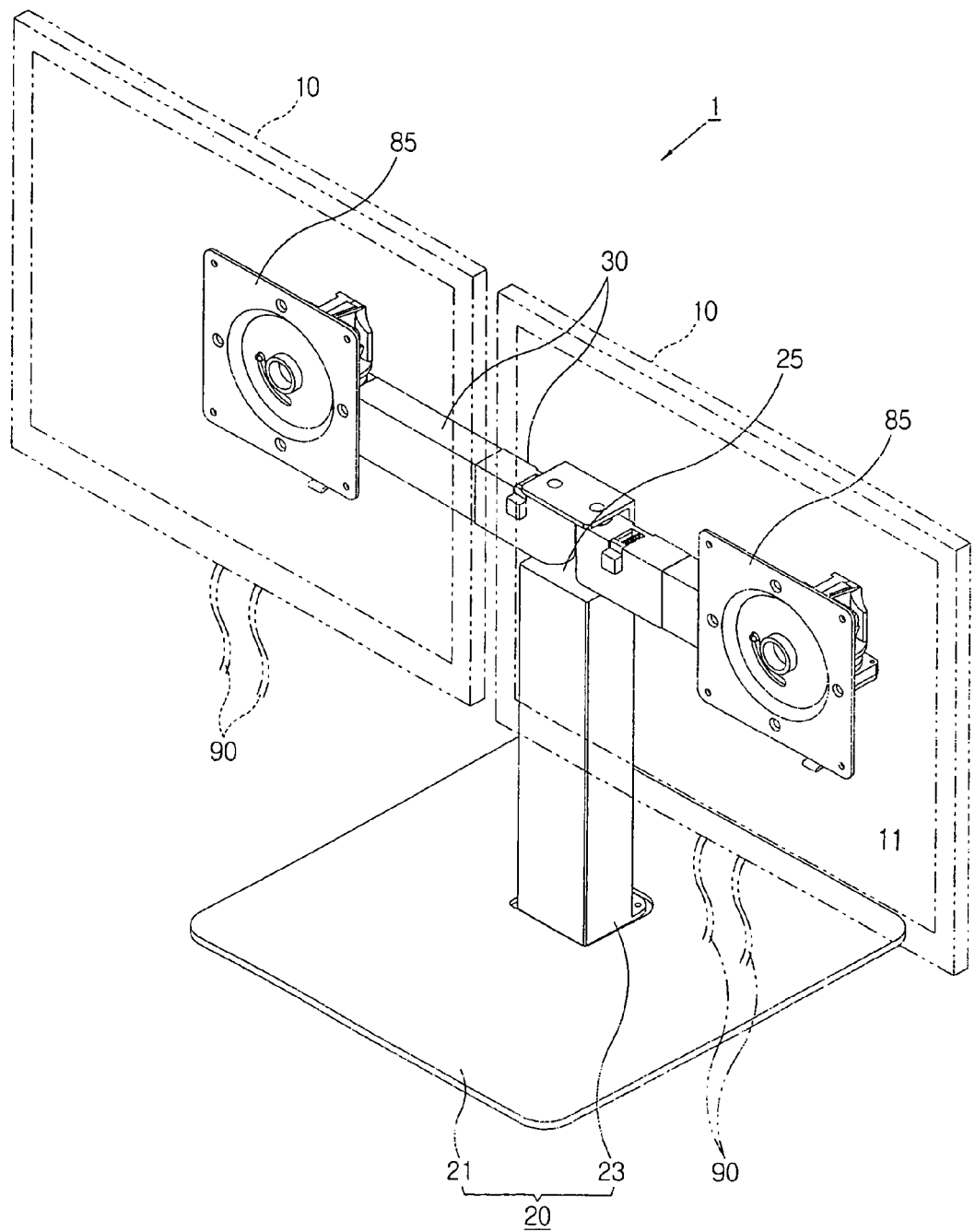
FIG. 2 is a perspective view illustrating a perspective view of a monitor apparatus according to an embodiment of the present general inventive concept.
Figure 3:
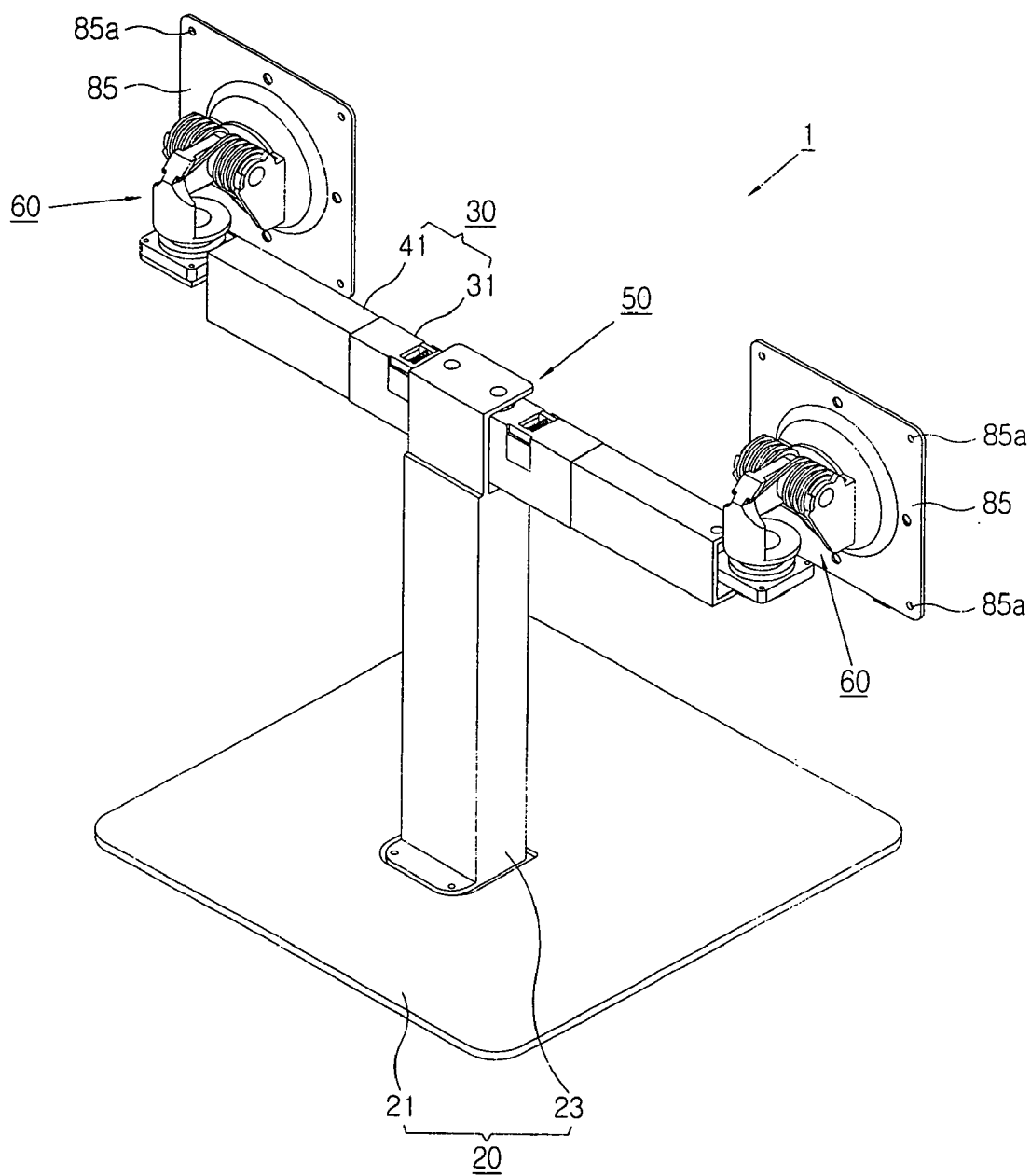
FIG. 3 is a rear perspective view illustrating the monitor apparatus of FIG. 2.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As shown in FIGS. 2 through 7, a monitor apparatus 1 according to an embodiment of the present general inventive concept may comprise a pair of monitor main bodies 10 to display a picture, a stand 20 to support the pair of monitor main bodies 10 with respect to a predetermined installation surface, at least one pair of supporting arms 30 provided between the monitor main body 10 and the stand 20 to support the monitor main body 10 with respect to the stand 20, a first hinge 50 provided between the stand 20 and each of the at lest one pair of supporting arms 30 to rotatably couple the each supporting arm 30 to the stand 20, and a second hinge 60 provided between the monitor main body 10 and the each supporting arm 30 to rotatably couple the monitor main body 10 to the each supporting arm 30.

The monitor main body 10 may comprise a display panel 11 which may be a thin shape, such as an LCD or a PDP, to display a picture. Further, the monitor main body 10 can be formed with a plurality of screw holes (not shown) formed on a rear side thereof to correspond to a coupling hole 85a of a pivoting bracket 85 (to be described later) coupled to the monitor main body 10 by a screw (not shown). Here, the screw hole of the display main body 10 and the coupling hole 85a of the pivoting bracket 85 are formed according to a video electronics standard association (VESA) standard. Alternatively, an arm stand (not shown) depending on the VESA standard may be coupled to the display main body 10 through the screw hole. According to an aspect of the present general inventive concept, the monitor main bodies 10 can be formed as a pair corresponding to respective ones of the pair of the supporting arms 30. However, three or more monitor main bodies may be provided and supported by the stand 20. Further, each monitor main body 10 can be connected with one or more cables 90 to transmit/receive an external electric power and a video signal. Such a cable 90 can connect a connection port (not shown) provided in each monitor apparatus 10 to a computer (not shown) or the like.

The stand 20 may comprise a base 21 seated on the predetermined installation surface, such as a table, and a standing unit 23 extended from the base 21.

The base 21 can have a shape like a plate to be seated on the installation surface. The base 21 may have an area enough to support one of the monitor main bodies 10 without falling even though the other monitor main body 10 is separated from the supporting arm 30.

The standing unit 23 stands against the base 21. In an upper portion of the standing unit 23 can be provided a supporting arm coupling part 25 to accommodate and hold a portion of each supporting arm 30, and a hinge shaft coupling part 27 (FIG. 4) coupled with a hinge shaft 51 (FIG. 4) of the first hinge 50 so that the supporting arm 30 is rotatably accommodated in the supporting arm coupling part 25.

Figure 5:
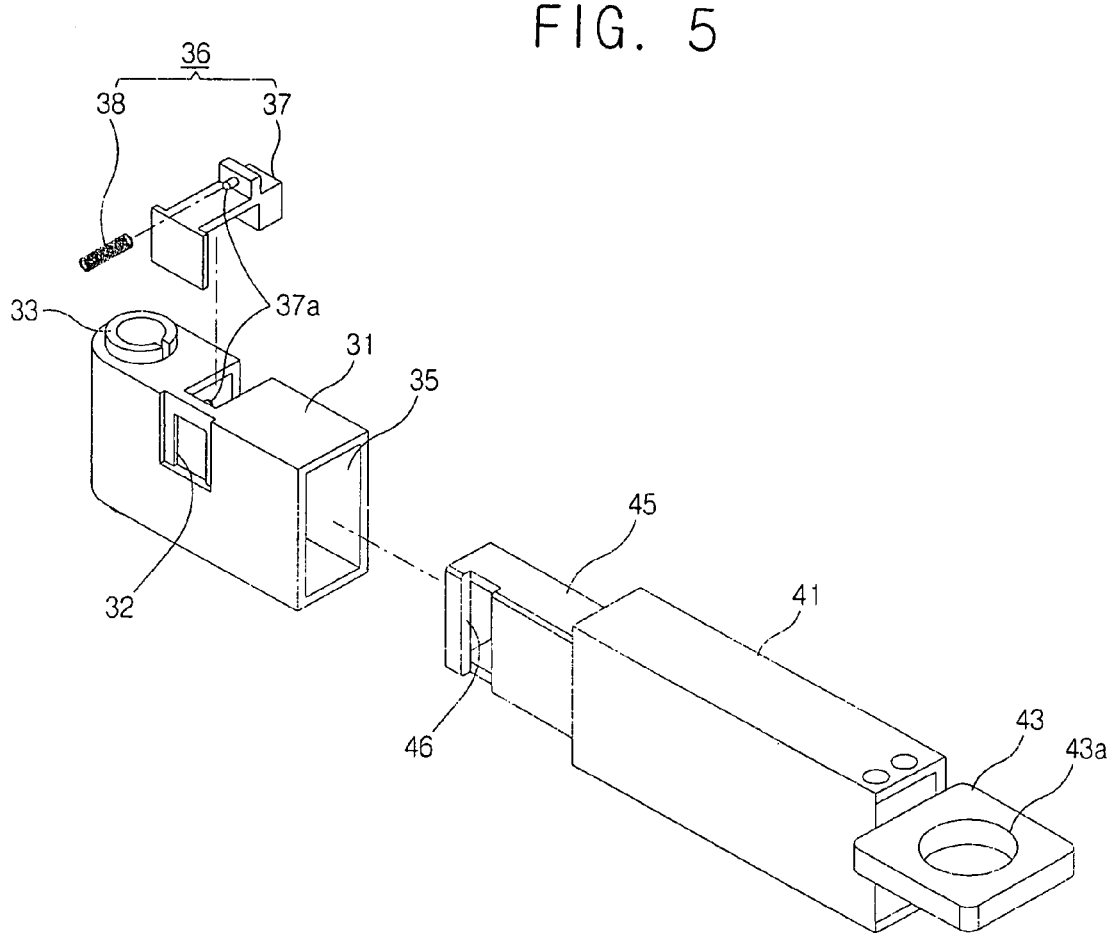
FIGS. 5 and 6 are exploded perspective view illustrating a supporting arm of the monitor apparatus of FIG. 3.

The supporting arm 30 may have predetermined rigidity and length suitable for supporting the monitor main body 10. Further, a length of the supporting arm 30 can be long enough to allow the monitor main bodies 10 to rotate without interfering with each other. Here, the supporting arm 30 may have a rectangular section, but may have a circular section, a polygonal section, etc. The supporting arm 30 can be detachably coupled to the stand 20. The supporting arm 30 may comprise a first arm 31 coupled to the first hinge 50, and a second arm 41 coupled to the second hinge 60 and detachably connected to the first arm 31. According to an aspect of the present general inventive concept, one of the first and second 31 and 41 arms 31 and 41 can be provided with a connecting projection 45, and the other one of the first and second arms can be provided with a projection holder 35 as shown in FIG. 5.

Figure 4:
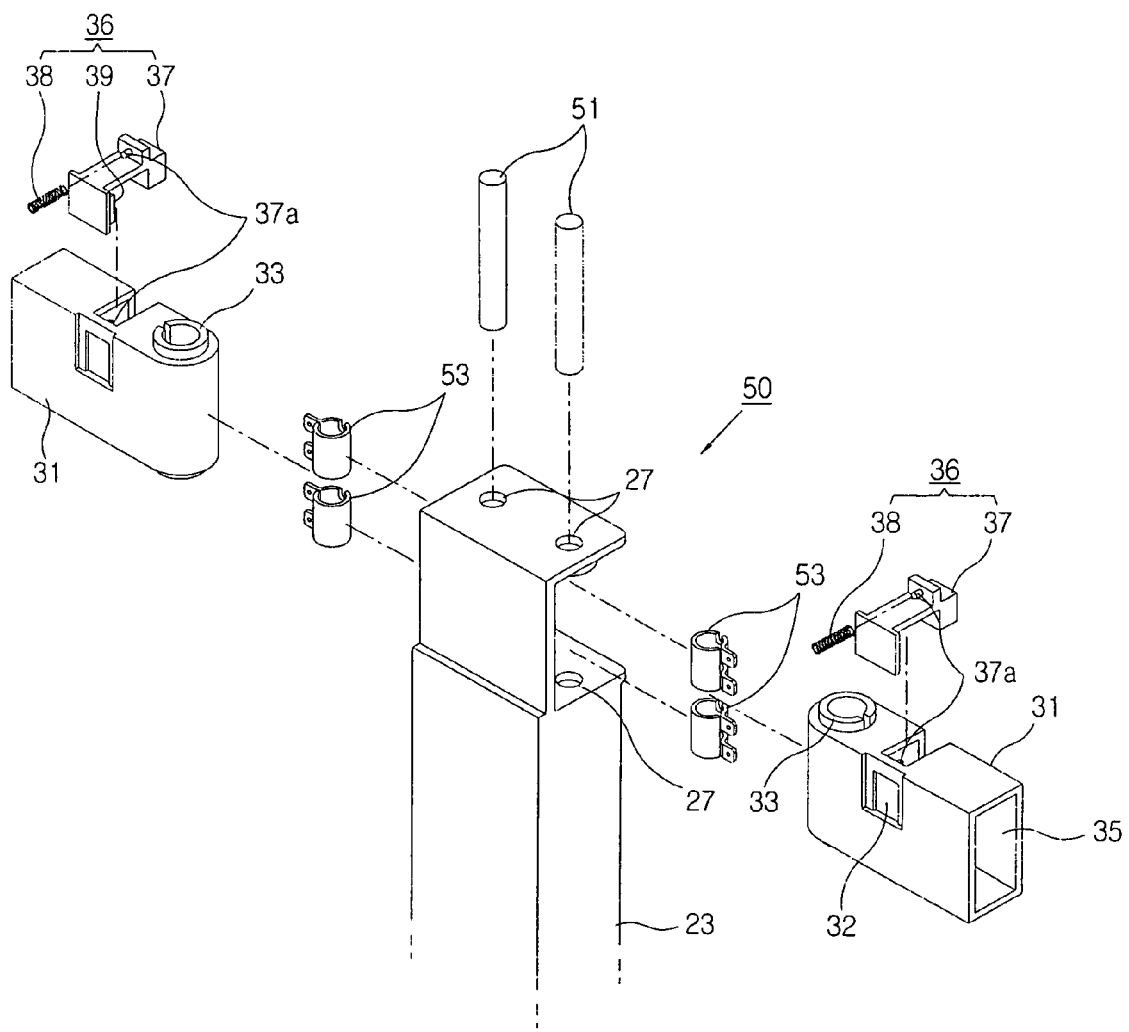
FIG. 4 is an exploded perspective view illustrating a first hinge of the monitor apparatus of FIG. 2.

The first arm 31 can be swivelly coupled to the supporting arm coupling part 25 of the standing unit 23 by the first hinge 50. A first end of the first arm 31 can be provided with the projection holder 35. Further, the first arm 31 can be provided with a hinge shaft accommodating part 33 in which the hinge shaft 51 and a friction unit 53 are accommodated as shown in FIGS. 4 and 5.

The second arm 41 may have a first end provided with the connecting projection 45 to be connected with the projection holder 35, and a second end provided with a swiveling shaft supporter 43 coupled to a swiveling shaft 63 (FIG. 7) of the second hinge 60 (to be described later).

The projection holder 35 can be recessed along a lengthwise direction of the supporting arm 30 from the first end of the first arm 31, so that the connecting projection 45 is connected to and separated from the first arm 31 in the lengthwise direction of the supporting arm 30. Further, the projection holder 35 can be provided with a locking unit 36 to be locked to and released from the connecting projection 45. In this case, the projection holder 35 can be formed with a locking supporter 32 through which the locking unit 36 passes and is coupled to the connecting projection 45.

The connecting projection 45 can protrude from the second arm 41 and can be detachably coupled to the projection holder 35 in the lengthwise direction of the supporting arm 30. Further, the connecting projection 45 can be formed with a lock groove 46 into which a lock 39 (FIGS. 4 and 6) of the locking unit 36 is locked.

Figure 6:
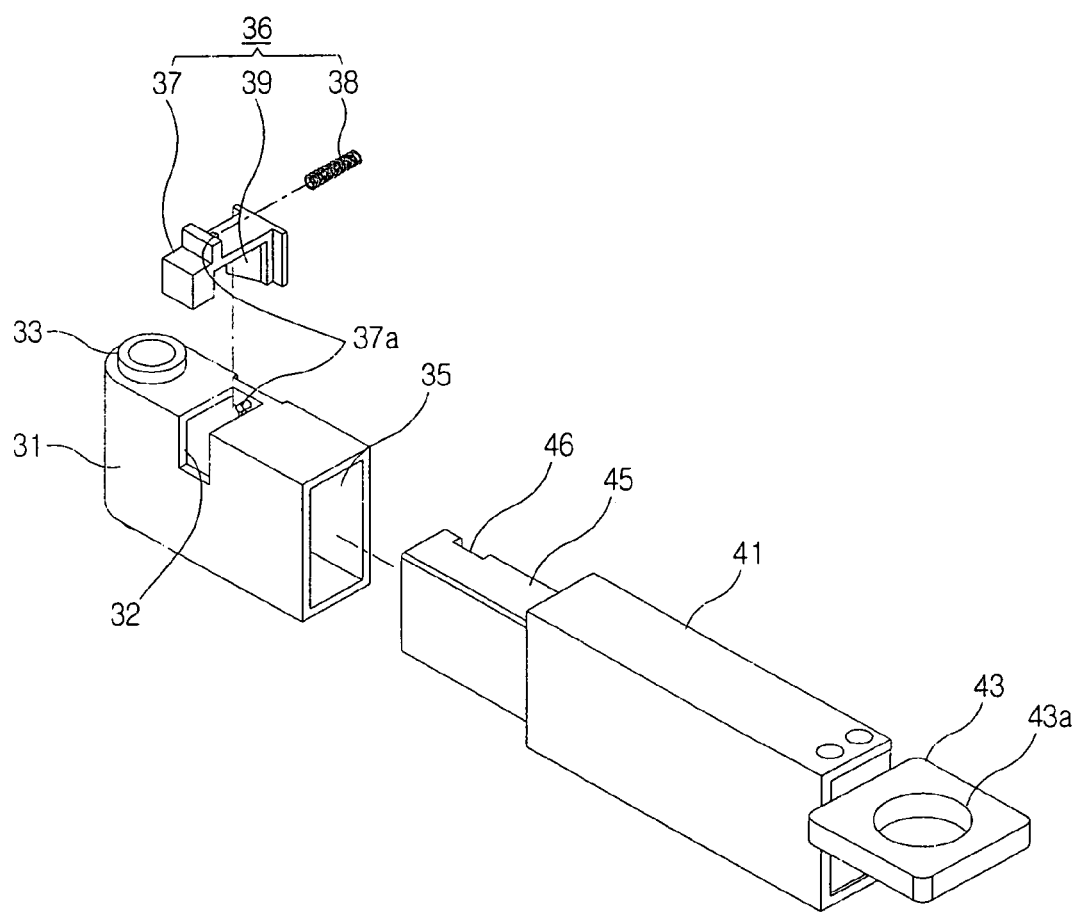

As shown in FIGS. 5 and 6, the locking unit 36 may comprise a locking body 37 having a first end inserted in the locking supporter 32 and a second end locked to an edge of the locking supporter 32, a spring 38 provided between the locking body 37 and the locking supporter 32, and the lock 39 protruding from the locking body 37 and inserted into and coupled to the lock groove 46 of the connecting projection 45.

The locking body 37 can be inserted into the locking supporter 32 and can reciprocate within a predetermined distance in a transverse direction to the lengthwise direction of the supporting arm 30. The spring 38 can be supported by spring supporters 37a protruding from the locking body 37 and the locking supporter 32, respectively. The lock 39 may have an inclined shape toward a locking direction of the connection projection 45, thereby allowing the connecting projection 45 to be easily locked into and difficultly released from the lock 39. However, the projection holder 35 and the connecting projection 45 may be connected to each other not in the lengthwise direction but in the transverse direction or a vertical direction.

Figure 8:
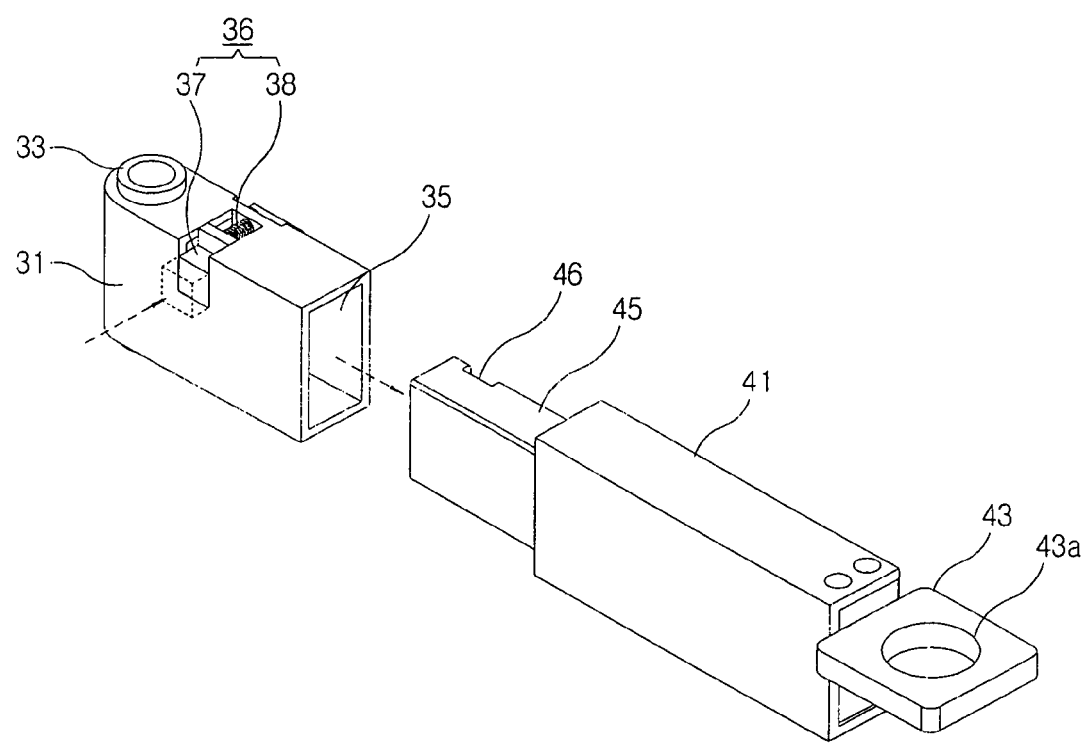
FIGS. 8 through 10 are views illustrating operations of the monitor apparatus of FIGS. 2-7.
Figure 11:
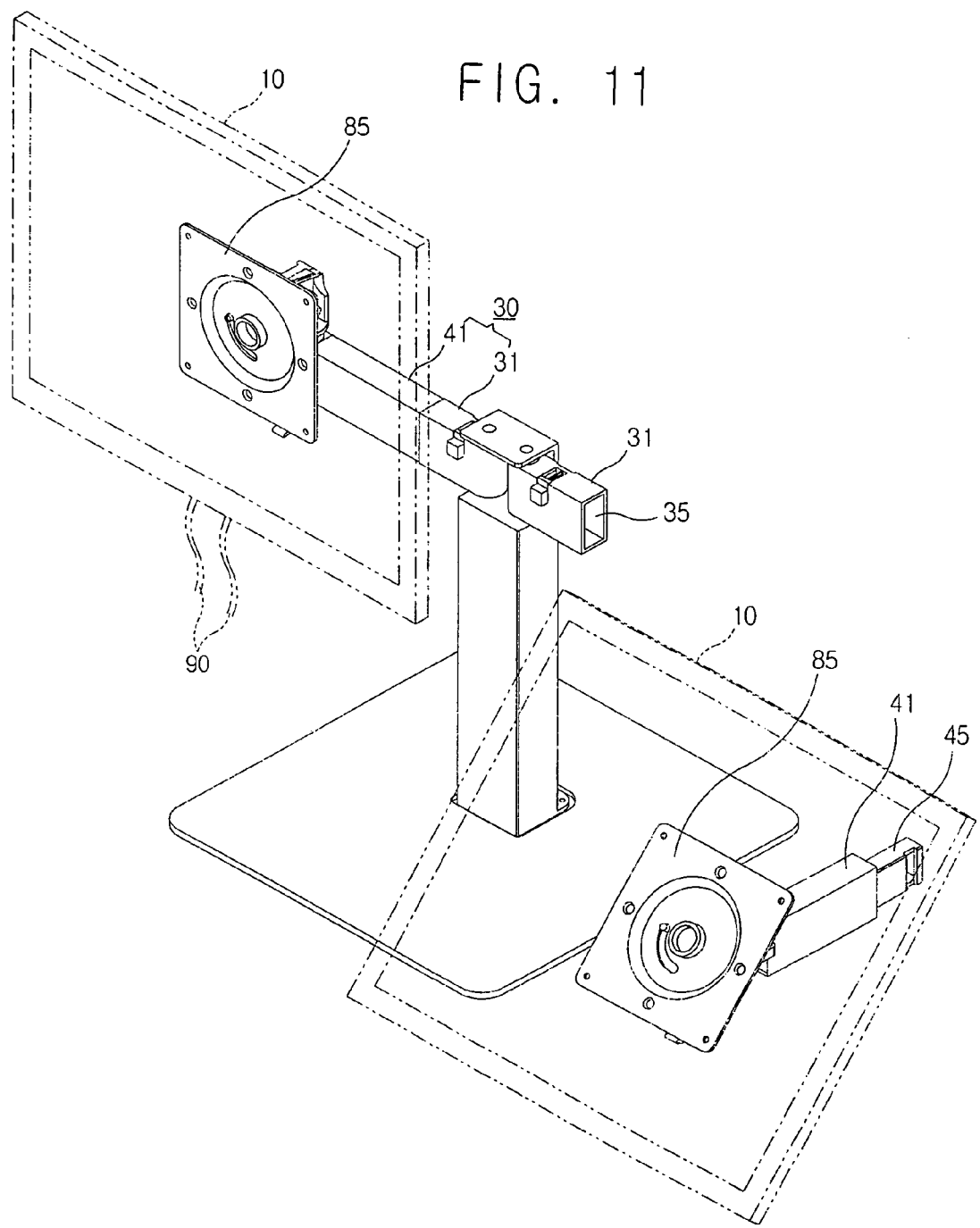
FIG. 11 is a view illustrating a state in which one of the monitor main bodies is separated from the monitor apparatus of FIGS. 2 and 3.

When the first arm 31 and the second arm 41 are connected to each other, the connecting projection 45 provided in the second arm 30 can be inserted into the projection holder 35 until the lock 39 is locked into the lock groove 46, thereby connecting the first arm 31 to the second arm 41. Oppositely, when the first arm 31 and the second arm 41 are separated from each other, the locking body 37 can be pressed to overcome the elasticity of the spring 38 until the lock 39 is released from the lock groove 46 as shown in FIG. 8. In this state, the connecting projection 45 of the second arm 41 can be separated from the projection holder 35 of the first arm 31, thereby separating the second arm 41 from the first arm 31. According to an aspect of the present general inventive concept, the second arm 41 can be detachably connected to the first arm 31, so that each of the pair of the monitor main bodies 10 along with the second arm 41 can be separated from the stand 20, as shown in FIG. 11, and the second arm and the each of the pair of the monitor main bodies 10 can be mounted to various installation surfaces, such as a table, if necessary.

Figure 9:
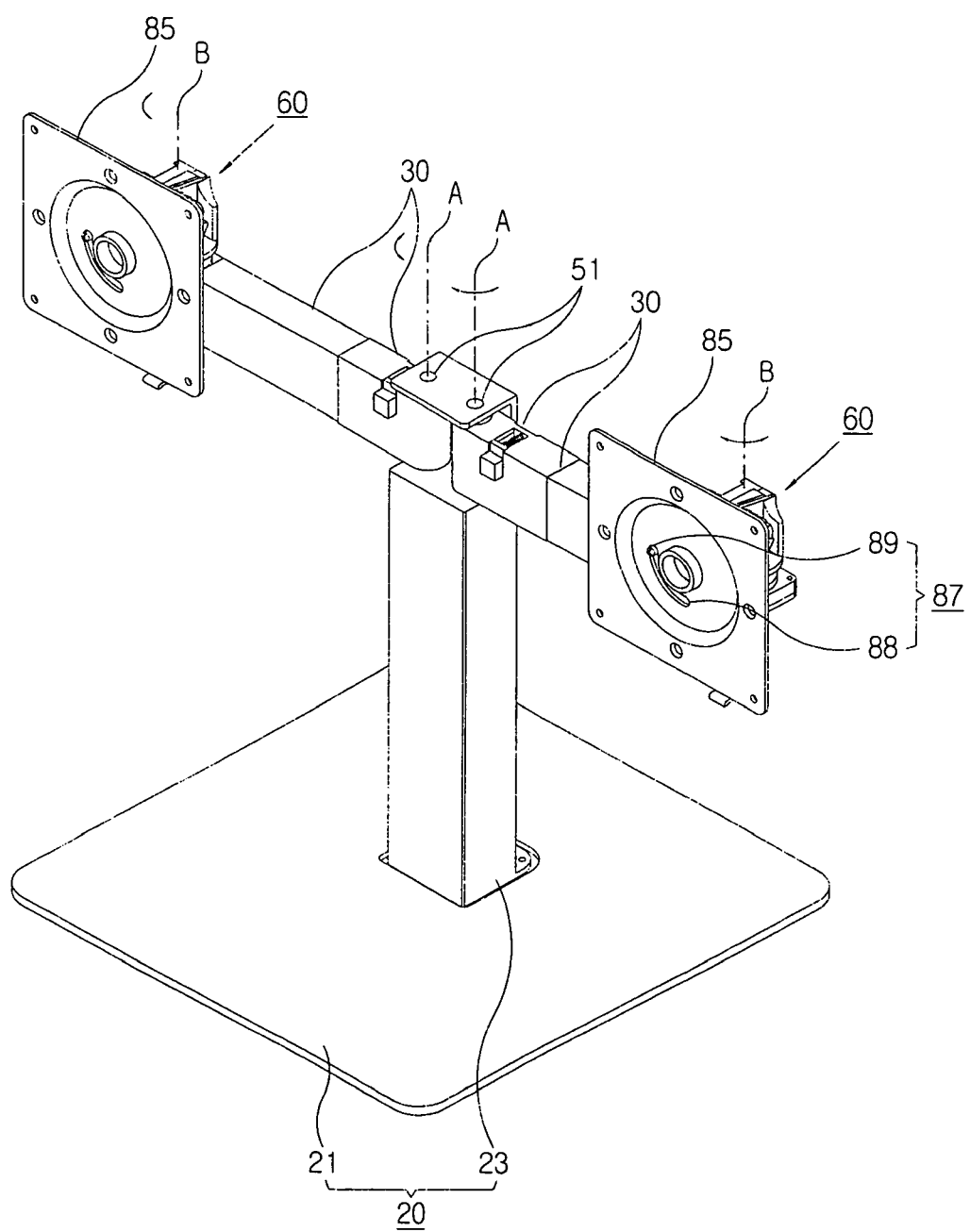

The first hinge 50 may comprise the hinge shaft 51 rotatably coupling the supporting arm 30 to the stand 20 along a vertical axis "A" as shown in FIG. 9. Further, the first hinge 50 may comprise at least one friction unit 53 having a first side coupled to the supporting arm 30 and a second side disposed in the hinge shaft accommodating part 33 of the first arm 31 to receive the hinge shaft 51 fitting therein to generate a predetermined rotational friction.

The hinge shaft 51 can be inserted into and coupled to the hinge shaft coupling part 27 of the stand 20. The hinge shaft 51 may have a noncircular section, so that the hinge shaft 51 does not rotate about the hinge shaft coupling part 27 while being inserted into the hinge shaft coupling part 27 of the stand 20.

The friction unit 53 may comprise a flat spring that has the first side coupled to the hinge shaft accommodating part 33 of the first arm 31 by a screw, and the second side circularly bent and fitting the hinge shaft 51 therein to elastically contact the hinge shaft 51. Further, the friction unit 53 may have a rotational friction suitable for a user to easily overcome. Thus, each supporting arm 30 can swivel about the stand 20 with respect to the vertical axis "A" of the hinge shaft 51 as shown in FIG. 9.

Figure 7:
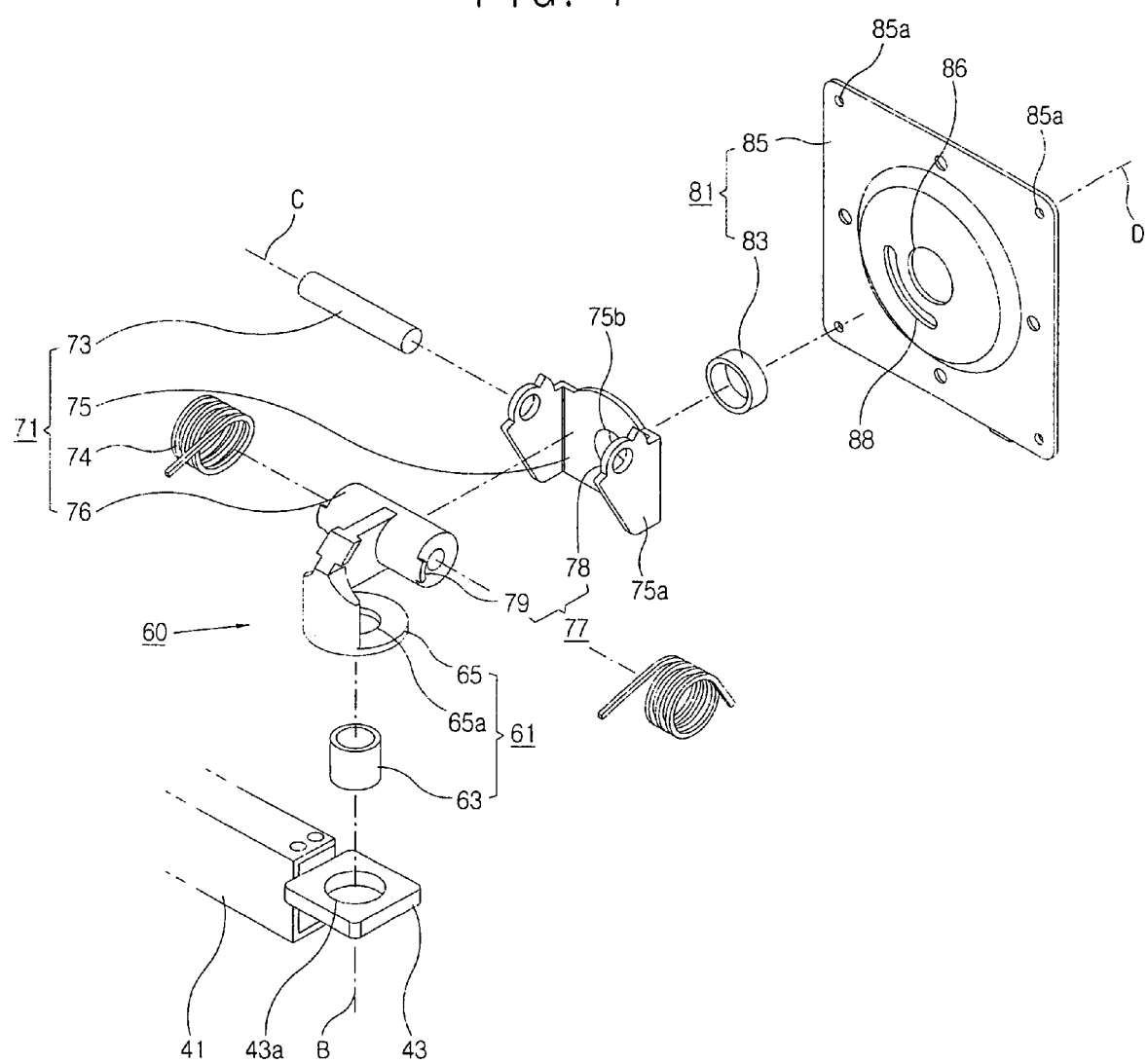
FIG. 7 is an exploded perspective view illustrating a second hinge of the monitor apparatus of FIG. 3.

As shown in FIG. 7, the second hinge 60 may comprise a swiveling unit 61 provided between the monitor main body 10 and the supporting arm 30 to swivelly couple the monitor main body 10 to the supporting arm 30. Further, the second hinge 60 may comprise a tilting unit 71 provided between the monitor main body 10 and the supporting arm 30 to tiltably couple the monitor main body 10 to the supporting arm 30. Also, the second hinge 60 may further comprise a pivoting unit 81 provided between the monitor main body 10 and the supporting arm 30 to pivotally couple the monitor main body 10 to the supporting arm 30. However, the second hinge 60 may comprise at least one of the swiveling unit 61, the tilting unit 71 and the pivoting unit 81.

The swiveling unit 61 may comprise a swiveling bracket 65 coupled to the monitor main body 10, and the swiveling shaft 63 to couple the swiveling bracket 65 to the supporting arm 30 along a vertical axis "B" as shown in FIG. 7.

The swiveling bracket 65 may have a first side coupled to the swiveling shaft 63 and a second side integrally coupled to a second tilting bracket 76 (to be described later). However, the second side of the swiveling bracket 65 may be directly coupled to the monitor main body 10 or may be coupled to a pivoting shaft 83 (to be described later).

The swiveling shaft 63 can be inserted into a swiveling shaft accommodating portion 43a formed in the swiveling shaft supporter 43 of the second arm 41 and also inserted into a swiveling shaft inserting portion 65a formed in the swiveling bracket 65. When the swiveling shaft 63 is inserted into both the swiveling shaft accommodating portion 43a and the swiveling shaft inserting portion 65a, opposite ends of the swiveling shaft 63 can be bent outward.

Further, the swiveling shaft 63 can be coupled to both the swiveling shaft supporter 43 and the swiveling bracket 65 to generate a predetermined rotational friction between the swiveling shaft 63 and at least one of the swiveling shaft supporter 43 and the swiveling bracket 65. The rotational friction of the swiveling shaft 63 can be suitable for a user to easily overcome when the user presses the monitor main body 10 to swivel.

Thus, the monitor main body 10 can swivel by the first hinge 50 and also swivel by the second hinge 60.

The tilting unit 71 may comprise a first tilting bracket 75 coupled to the monitor main body 10, the second tilting bracket 76 coupled to the supporting arm 30, and a tilting shaft 73 to tiltably couple the first tilting bracket 75 to the second tilting bracket 76 along a left and right direction axis "C". The tilting unit 71 may further comprise a torsion coil spring 74 having a first end supported by the first tilting bracket 75 and a second end supported by the second tilting bracket 76. Also, the tilting unit 71 may further comprise a tilting angle restricting part 77 to restrict a tilting angle of the first tilting bracket 75 relative to the second tilting bracket 76.

The first tilting bracket 75 may comprise a pair of bending portions 75a formed at opposite sides thereof to accommodate and couple with the tilting shaft 73. Further, the first tilting bracket 75 can be formed with a pivoting shaft coupling part 75b placed between the bending portions 75a so as to be coupled to the pivoting shaft 83 (to be described later). However, the first tilting bracket 75 may be directly coupled to the monitor main body 10.

The second tilting bracket 76 can be placed between the bending portions 75a of the first tilting bracket 75 to accommodate the tilting shaft 73. The second tilting bracket 76 can be integrally coupled to the swiveling bracket 65 at a middle portion thereof. However, the second tilting bracket 76 may be directly coupled to the supporting arm 30.

The tilting shaft 73 can be inserted into and tiltably coupled to both the first tilting bracket 75 and the second tilting bracket 76, with a predetermined rotational friction between the tilting shaft 73 and at least one of the first tilting bracket 75 and the second tilting bracket 76. Here, the rotational friction of the tilting shaft 73 can be suitable for a user to easily overcome when the user presses the monitor main body 10 to tilt.

The torsion coil spring 74 elastically presses the first tilting bracket 75 against the second tilting bracket 76 with predetermined elasticity. That is, the torsion coil spring 74 presses the first tilting bracket 75 with elasticity enough to prevent the monitor main body 10 coupled to the first tilting bracket 75 from being tilted downward due to its own weight.

Thus, the monitor main body 10 can tilt about the supporting arm 30 by the tilting unit 71 provided in the second hinge 60.

The tilting angle restricting part 77 may comprise an arc-cutting portion 78 formed on one of the first and second tilting brackets 75 and 76, and a tilting stopper 79 formed on the other one of the first and second tilting brackets 75 and 76. The arc-cutting portion 78 can be formed on the bending portion 75a of the first tilting bracket 75 and can have a shape like an arc of a predetermined angle. The tilting stopper 79 can protrude from the second tilting bracket 76 so as to be accommodated within the arc-cutting portion 78. Hence, when the first tilting bracket 75 is tilted about the second tilting bracket 76 and/or the tilting shaft 73, the tilting angle of the first tilting bracket 75 can be restricted by the tilting stopper 79 provided in the second tilting bracket 76. A rotational movement between the second tilting bracket 76 and the first tilting bracket 75 can be limited by a contact between the tilting stopper 79 and at least one end of the arc cutting portions on the bending portion 75a.

The pivoting unit 81 may comprise a pivoting bracket 85 coupled to the monitor main body 10, and the pivoting shaft 83 to pivotally couple the pivoting bracket 85 to the supporting arm 30 along a back and forth direction axis "D." Further, the pivoting unit 81 can comprise a pivoting angle restricting part 87 (FIG. 9) to restrict a pivoting angle of the pivoting bracket 85.

As shown in FIG. 9, the pivoting bracket 85 may comprise a plurality of coupling hole 85a to correspond to the screw holes of the monitor main body 10 when the pivoting bracket 85 is coupled to the monitor main body 10 by the screw, and a pivoting shaft accommodating part 86 to accommodate and be coupled to the pivoting shaft 83. Further, the pivoting bracket 85 can be shaped like a rectangular plate. The coupling holes 85a can be formed at corners of the rectangular plate. The pivoting shaft accommodating part 86 can be formed at a center portion of the pivoting bracket 85.

The pivoting shaft 83 can be inserted into and pivotally coupled to both the pivoting shaft coupling part 75b of the first tilting bracket 75 and the pivoting shaft accommodating part 86 of the pivoting bracket 85. When the pivoting shaft 83 is inserted into both the pivoting shaft coupling part 75b and the pivoting shaft accommodating part 86, opposite ends of the pivoting shaft 83 can be bent outward. Additionally, the pivoting shaft 83 can be coupled to a plurality of washers. Such washers can be provided between the first tilting bracket 75 and the pivoting bracket 85, so that a rotational friction is generated when the pivoting bracket 85 pivots about the first tilting bracket 75. Here, the rotational friction between the pivoting bracket 85 and the first tilting bracket 75 can be suitable for a user to easily overcome when the user presses the monitor main body 10 to pivot.

Thus, the monitor main body 10 can pivot about the supporting arm 30 by the pivoting unit 81 provided in the second hinge 60.

The pivoting angle restricting part 87 may comprise an arc-shaped slit 88 (FIGS. 8 and 9) formed in the pivoting brackets 85, and a pivoting stopper 89 (FIG. 9) provided in the first tilting bracket 75 so as to be inserted into the arch-shaped slit 88. Here, the arc-shaped slit 88 can be formed when a portion of the pivoting bracket 85 is cut off like an arc of 90°, but the arc may be of 180° or 270°. The pivoting stopper 89 can be inserted into the arc-shaped slit 88 and can restrict the pivoting angle of the pivoting bracket 85. Therefore, when the pivoting bracket 85 pivots about the first tilting bracket 75 and/or the pivoting shaft 83, the pivoting angle of the pivoting bracket 85 can be restricted by the pivoting stopper 89 provided in the first tilting bracket 75.

With this configuration, operations of the monitor apparatus 1 according to this embodiment of the present general inventive concept are as follows.

First, as shown in FIG. 9, the monitor main body 10 can swivel by the supporting arm 30 about the stand 20 and/or the vertical axis "A" of the hinge shaft 51 provided in the first hinge 50. Further, the monitor main body 10 can swivel with respect to the vertical axis "B" of the swiveling shaft 63 provided in the second hinge 60. Therefore, a user can control the monitor main body 10 to swivel not only near to the user but also at various angles.

Figure 10:
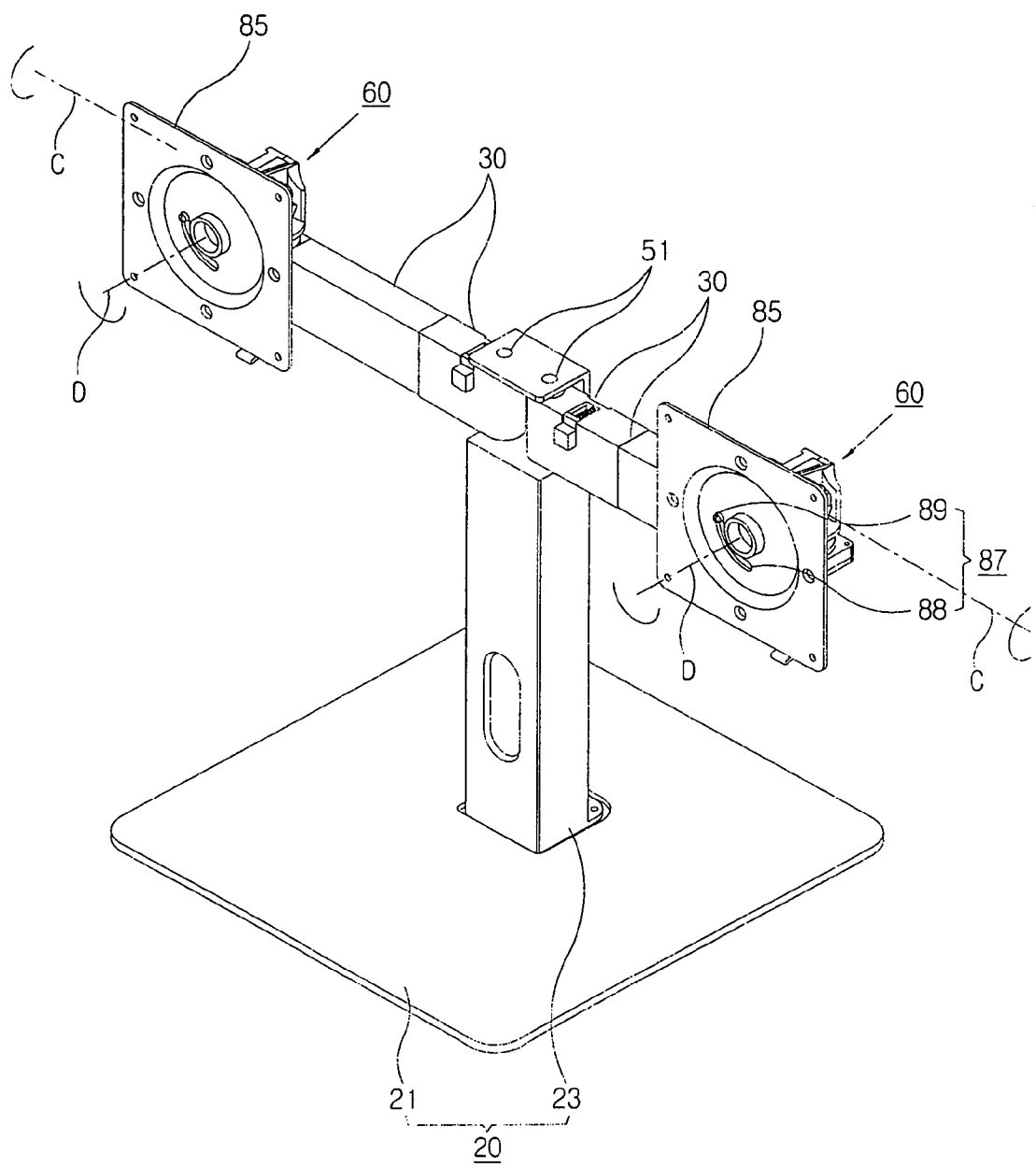

Further, as shown in FIG. 10, the monitor main body 10 can tilt about the stand 20 and/or the left and right direction axis "C" of the tilting shaft 73 provided in the second hinge 60. Also, the monitor main body 10 can pivot about the stand 20 and/or the back and forth direction axis "D" of the pivoting shaft 83 provided in the second hinge 60. Therefore, a user can control the monitor main body 10 to tilt and pivot at further various angles.

Besides, as shown in FIG. 11, the supporting arm 30 can be divided into the first arm 31 and the second arm 41, so that each monitor main body 10 along with the second arm 41 and/or the first arm 31 can be separated from the stand 20 and can be mounted to various installation surfaces, such as a table, as necessary, while the other monitor main body 10 along with the other second arm 41 and the other first arm 31 can be coupled to the stand 20. When the separated monitor main body 10 is disposed on the installation surfaces, the separated monitor main body 10 can form an angle with the installation surfaces due to the second arm 41 and/or the first arm 31.

Figure 12:
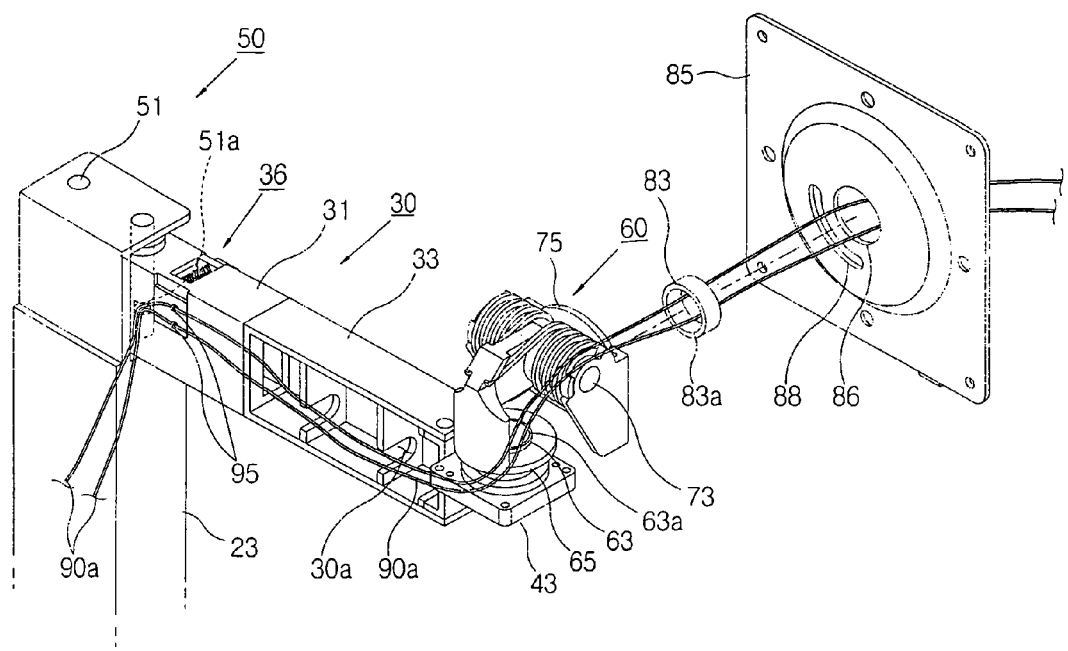
FIG. 12 is a partial exploded perspective view illustrating a monitor apparatus having one or more cables embedded therein according to another embodiment of the present general inventive concept.
Figure 13:
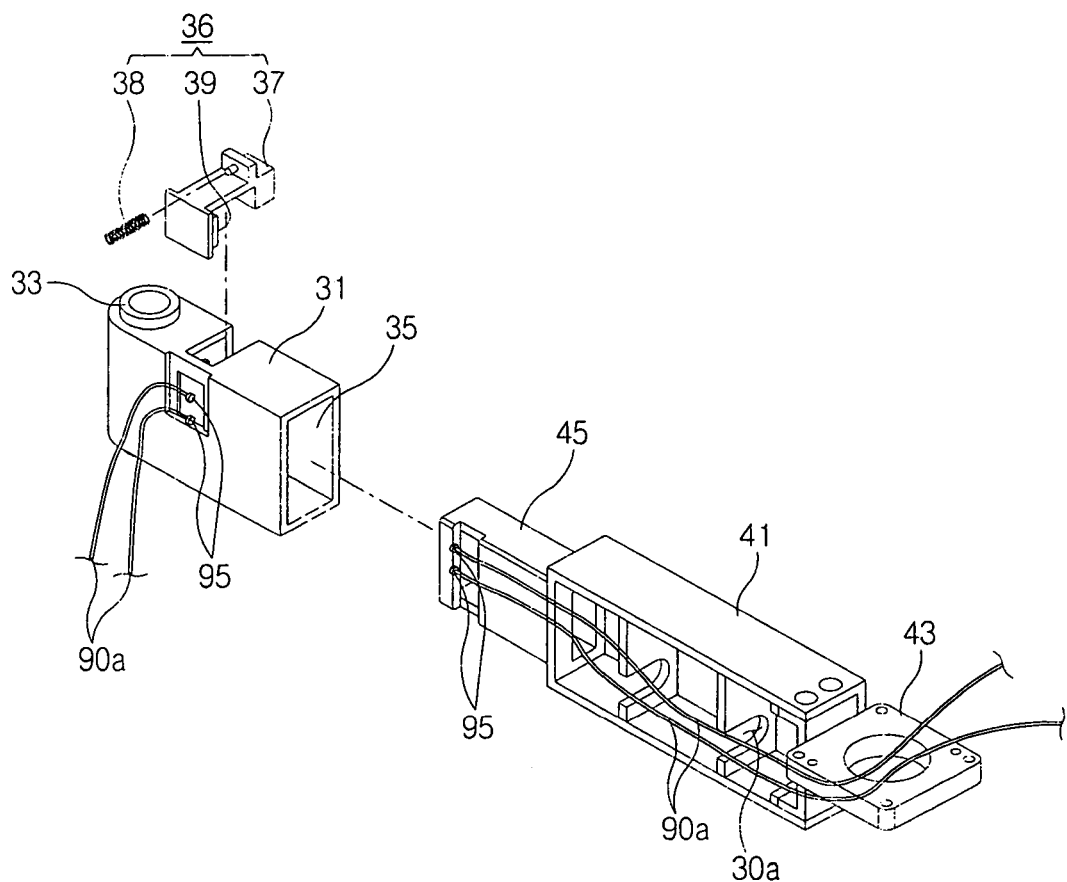
FIG. 13 is an exploded perspective view illustrating a supporting arm of the display apparatus of FIG. 12.

FIG. 12 is a partial exploded perspective view illustrating a monitor apparatus 1 and a monitor main body 10 having one or more cables 90a embedded therein according to another embodiment of the present general inventive concept, and FIG. 13 is an exploded perspective view illustrating a supporting arm 30 of the monitor apparatus of FIG. 12.

As shown in FIGS. 2-11, 12, and 13, in the monitor apparatus 1, the cable 90a connected to a monitor main body 10 can be embedded inside a second hinge 60 and a first hinge 50 of the supporting arm 30 and electrically connected to a stand 20. Since elements of FIGS. 12 and 13 are identical to FIGS. 2-8, corresponding descriptions will be omitted.

A pivoting shaft 83 provided in the second hinge 60 can be formed with a third cable through portion 83a shaped like a hollow through which the cable 90a extended from the monitor main body 10 toward the supporting arm 30 passes. Further, a swiveling shaft 63 can be formed with a second cable through portion 63a shaped like a hollow through which the cable 90a passes. Also, a hinge shaft 51 provided in the first hinge 50 can be formed with a first cable through portion 51a shaped like a hollow through which the cable 90a extended from the supporting arm 30 toward the stand 20 passes.

In an aspect of the present general inventive concept, the supporting arm 30 may comprise a cable accommodating portion 30a in which the cables 90a connecting the monitor main body 10 with the stand 20 are embedded. That is, a first arm 31 and a second arm 41 can respectively accommodate therein the cables 90a that electrically connects the monitor main body 10 to the stand 20. In another aspect of the present general inventive concept, the first arm 31 and the second arm 41 can respectively comprise connection terminals 95 to be connected to each other when the first arm 31 and the second arm 41 are connected to each other. The connection terminals 95 can be respectively connected to the separate cables 90a and can connect the cables 90a separately accommodated in the first and second arms 31 and 41 to each other when the first arm 31 and the second arm 41 are connected.

At least one connection terminal 95 can be provided inside a projection holder 35 of the first arm 31 and inside a connecting projection 45 of the second arm 41. When the first and second arms 31 and 41 can be connected to each other, the respective connection terminals 95 of the first and second arms 31 and 41 are easily connected. Oppositely, when the first and second arms 31 and 41 are separated from each other, the respective connection terminals 95 of the first and second arms 31 and 41 can be easily separated.

Further, the monitor main body 10 separated from the stand 20 can be directly connected to an external device by a cable electrically connecting the connection port (not shown) provided in the monitor main body 10 with the external device.

Further, the stand 20 may comprise at least one connection port (not shown) connected to the cable 90a to transmit/receive an external electric power and a video signal.

Thus, in the monitor apparatus according to this embodiment of the present general inventive concept, the cables 90a electrically connecting the monitor main body 10 to the stand 20 can be embedded in the first hinge 50, the second hinge 60, and the supporting arm 30, and may not exposed to an outside of the monitor apparatus 1, thereby making an outer appearance of the monitor apparatus neat and beautiful.

Further, the first and second arms 31 and 41 can respectively comprise the connection terminals 95 to be connected to each other, so that the first arm 31 and the second arm 41 can be easily separated from each other regardless of the cable 90a.

As described above, the present general inventive concept can provide a monitor apparatus comprising at least one pair of monitor main bodies to rotate the monitor main body not only near to a user but also at various angles.

Further, the present general inventive concept can provide a monitor apparatus comprising at least one pair of monitor main bodies, in which a supporting arm is detachably provided, so that each monitor main body can be separated from the stand and mounted to various installation surfaces as necessary.

Still further, the present general inventive concept can provide a monitor apparatus, in which a cable electrically connecting the monitor main body with the stand is embedded, thereby making an outer appearance of the monitor apparatus neat.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A monitor apparatus comprising:
a plurality of monitor main bodies to display a picture;
a stand to support the monitor main bodies with respect to an installation surface;
a plurality of supporting arms respectively provided between each monitor main body of the monitor main bodies and the stand to support the monitor main bodies with respect to the stand;
a first hinge axially oriented parallel to the stand between the stand and each supporting arm of the supporting arms to swivelly couple the each supporting arm to the stand; and
a second hinge provided between the each monitor main body and the each supporting arm to swivelly couple the each monitor main body to the each supporting arm.

2. The monitor apparatus of claim 1, further comprising:
a cable to electrically connect the each monitor main body to the stand,
wherein the cable is embedded in the first hinge coupled to the each supporting arm, the each supporting arm, and the second hinge coupled to the each monitor main body.

3. The monitor apparatus of claim 1, wherein the each supporting arm comprises a first arm coupled to the first hinge, and a second arm coupled to the second hinge and detachably connected to the first arm.

4. The monitor apparatus of claim 3, wherein one of the first and second arms comprises a connecting projection, and the other one of the first and second arms comprises a projection holder.

5. The monitor apparatus claim 4, wherein the connecting projection is connected to and separated from the projection holder in a lengthwise direction of the each supporting arm, and the projection holder comprises a locking unit to be locked into and released from the connecting projection.

6. The monitor apparatus of claim 3, further comprising:
a first connection terminal formed on the first arm;
a second connection terminal formed on the second arm;
a first cable embedded in the first arm to connect the first connection terminal to the stand; and
a second cable embedded in the second arm to connect the second connection terminal to the each monitor main body,
wherein the first and second connection terminal are connected to each other when the first and second arms are connected.

7. The monitor apparatus of claim 1, wherein the first hinge comprises a hinge shaft to rotatably couple the each supporting arm to the stand with respect to a vertical axis.

8. The monitor apparatus of claim 7, wherein the hinge shaft comprises a hollow structure, and the each supporting arm comprises a cable extended from the each supporting arm to the stand to pass through the hollow structure.

9. The monitor apparatus of claim 1, wherein the second hinge comprises:
a swiveling bracket coupled to the each monitor main body; and
a swiveling shaft coupling the each supporting arm with the swiveling bracket along a vertical axis and swivelly coupled to at least one of the each supporting arm and the swiveling bracket.

10. The monitor apparatus of claimed 9, wherein the swiveling shaft comprises a hollow structure, and the each supporting arm comprises a cable extended from the each monitor main body to the each supporting arm to pass through the hollow structure.

11. The monitor apparatus of claim 1, wherein the second hinge tiltably couples the each monitor main body to the each supporting arm.

12. The monitor apparatus of claim 11, wherein the second hinge comprises:
a first tilting bracket coupled to the each monitor main body;
a second tilting bracket coupled to the each supporting arm; and
a tilting shaft to couple the first tilting bracket to the second tilting bracket with respect to a left and right direction axis.

13. The monitor apparatus of claim 12, wherein the second hinge further comprises a tilting angle restricting part to restrict a tilting angle of the first tilting bracket with respect to the second tilting bracket.

14. The monitor apparatus of claim 13, wherein one of the first tilting bracket and the second tilting bracket comprises an arc-cutting portion, and the other one of the first tilting bracket and the second tilting bracket comprises a tilting stopper to restrict the tilting angle between the first tilting bracket and the second tilting bracket.

15. The monitor apparatus of claim 11, wherein the each monitor main body is pivotally coupled to the each supporting arm.

16. The monitor apparatus of claim 15, wherein the second hinge comprises:
a pivoting bracket coupled to the each monitor main body; and
a pivoting shaft to pivotally couple the pivoting bracket to the each supporting arm with respect to a back and forth direction axis.

17. The monitor apparatus of claim 16, wherein the second hinge further comprises a pivoting angle restricting part to restrict a pivoting angle of the pivoting bracket with respect to the each supporting arm.

18. The monitor apparatus of claim 17, wherein the pivoting bracket comprises an arc-shaped slit, and the second hinge comprises a pivot stopper to restrict the pivoting angle between the pivoting bracket and the each supporting arm.

19. The monitor apparatus of claim 16, wherein the pivoting shaft comprises a hollow structure, and the each supporting arm comprises a cable extended from the each monitor main body to the each supporting arm to pass through the hollow structure.

20. The monitor apparatus of claim 1, wherein the each monitor main body is pivotally coupled to the each supporting arm.

21. The monitor apparatus of claim 20, wherein the second hinge comprises:
a pivoting bracket coupled to the each monitor main body; and
a pivoting shaft to pivotally couple the pivoting bracket to the each supporting arm with respect to a back and forth direction axis.

22. The monitor apparatus at claim 21, wherein the second hinge further comprises a pivoting angle restricting part to restrict a pivoting angle of the pivoting bracket with respect to the each supporting arm.

23. The monitor apparatus of claim 21, wherein the pivoting shaft comprises a hollow structure, and the each supporting arm comprises a cable extended from the each monitor main body to the each supporting arm to pass through the hollow structure.

24. A monitor apparatus comprising:
a plurality of monitor main bodies to display a picture;
a stand to support the monitor main bodies with respect to an installation surface; and
a plurality of supporting arms provided between each monitor main body of the monitor main bodies and the stand to support the each monitor main body with respect to the stand, each supporting arm of the supporting arms being detachably coupled to the stand
wherein the each supporting arm is extended from the stand in a lengthwise direction of the each supporting arm and is detached from the stand in the lengthwise direction.

25. The monitor apparatus of claim 24, wherein the each supporting arm comprises a first arm coupled to the first hinge, and a second arm coupled to the second hinge and detachably connected to the first arm.

26. The monitor apparatus of claim 25, wherein one of the first and second arms comprises a connecting projection, and the other one of the first and second arms comprises a projection holder.

27. The monitor apparatus of claim 26, wherein the connecting projection is connected to and separated from the projection holder in the lengthwise direction of the each supporting arm, and the projection holder comprises a locking unit to be locked into and released from the connecting projection.

28. The monitor apparatus of claim 24, further comprising a first hinge provided between the stand and the each supporting arm to swivelly couple the each supporting arm to the stand.

29. The monitor apparatus of claim 28, further comprising a second hinge provided between the each monitor main body and the each supporting arm to tiltably couple the each monitor main body to the each supporting arm.

30. The monitor apparatus of claim 29, wherein the second hinge swivelly couples the each monitor main body to the each supporting arm.

31. The monitor apparatus of claim 30, wherein the second hinge pivotally couples the each monitor main body with the each supporting arm.

32. The monitor apparatus of claim 29, wherein the second hinge pivotally couples the each monitor main body to the each supporting arm.

33. The monitor apparatus of claim 24, further comprising:
a cable to connect the each monitor main body to the stand;
a first hinge to swivelly couple the each supporting arm to the stand; and
a second hinge to swivelly or pivotably couple the each monitor main body to the each supporting arm,
wherein the cable is embedded in the first hinge coupled to the each supporting arm, the each supporting arm, and the second hinge coupled to the each monitor main body.

34. The monitor apparatus of claim 33, wherein the first and second arms comprise a first and a second connection terminals, respectively, the cable comprises a first cable connected between the stand and the first connection terminal, and a second cable connected between the second connection terminal and the each monitor main body, and the first and second connection terminals are connected to each other when the first and second arms are connected.

35. The monitor apparatus of claim 24, wherein the each supporting arm comprises a first end rotatably coupled to the stand, and a second end rotatably coupled to the each monitor main body.

36. The monitor apparatus of claim 35, wherein the each supporting arm rotates in a first direction with respect to the stand and the each monitor main body rotates in a second direction with respect to the each supporting arm.

37. The monitor apparatus of claim 24, wherein the plurality of monitor main bodies defines a pair of monitor main bodies respectively supported by a pair of the supporting arms, and one of the supporting arms is coupled to a corresponding one of the pair of monitor main bodies and detached from the stand without interfering with a connection between the other one of the supporting arms and the stand.

38. The monitor apparatus of claim 24, wherein the supporting arms are extended from the stand in a direction having an angle with a lengthwise direction of the stand and the monitor main bodies are spaced-apart from the stand by a distance corresponding to a length of the each supporting arm in the lengthwise direction.

39. The monitor apparatus of claim 24, wherein the each supporting arm is rotatably coupled to the stand and to the each monitor main body so that the each monitor main body rotates with respect to the stand in a first direction and a second direction.

40. The monitor apparatus of claim 24, further comprising:
a tilting unit coupled between the each supporting arm and the each monitor main body to rotate the each monitor main body with respect to the each supporting arm in a tilting direction.

41. The monitor apparatus of claim 24, further comprising:
a pivoting unit coupled between the each supporting arm and the each monitor main body to rotate the each monitor main body with respect to the each supporting arm in a pivoting direction.

42. A monitor apparatus comprising:
a plurality of monitor main bodies to display a picture;
a stand to support the monitor main bodies with respect to an installation surface;
a plurality of supporting arms provided between each monitor main body of the monitor main bodies and the stand to support the each monitor main body with respect to the stand, each supporting arm of the supporting arms being detachably coupled to the stand; and
a cable to electrically connect the each monitor main body to an electrical source,
wherein the cable is embedded in the each supporting arm.

43. A monitor apparatus comprising,
a plurality of monitor main bodies to display a picture;
a stand to support the monitor main bodies with respect to an installation surface; and
a plurality supporting arms provided between each monitor main body of the monitor main bodies and the stand to support the each monitor main body with respect to the stand, each supporting arm of the supporting arms being detachably coupled to the stand,
wherein the plurality of monitor main bodies defines a pair of monitor main bodies, and one of the pair of monitor main bodies rotates with respect to the stand in a first, a second, and a third directions, and the other one of the pair of monitor main bodies rotates with respect to the stand in a fourth, a fifth, and a sixth directions.

44. The monitor apparatus of claim 43, wherein the first, second, third, fourth, fifth, and sixth directions are different from one another.

45. A monitor apparatus comprising,
a plurality of monitor main bodies to display a picture;
a stand to support the monitor main bodies with respect to an installation surface; and
a plurality of supporting arms provided between each monitor main body of the monitor main bodies and the stand to support the each monitor main body with respect to the stand, each supporting arm of the supporting arms being detachably coupled to the stand,
wherein the plurality of monitor main bodies defines a pair of monitor main bodies, and one of the pair of monitor main bodies forms a first angle with respect to a reference plane corresponding to the installation surface on which a lengthwise axis of the stand is placed, when the one of the monitor main bodies is connected to the stand through one of the supporting arms, and the other one of the pair of monitor main bodies forms a second angle with respect to the reference plane when the one of the monitor main bodies is detached from the stand.

46. The monitor apparatus of claim 45, wherein the first angle and the second angle are not perpendicular to the reference plane.

47. The monitor apparatus of claim 46, wherein the first angle and the second angle are different from each other.

48. An apparatus to support a plurality of monitor main bodies comprising:
a plurality of first arms respectively extending from the monitor main bodies and pivotable with respect thereto, each of the first arms to support a corresponding one of the monitor main bodies against a planar surface at a selectable angle with respect thereto; and
a stand to detachably receive the first arms in respective second arms thereof, the second arms pivotable to translate in a plane parallel to an installation surface on which the stand is supported.

49. An apparatus to support a plurality of monitor main bodies comprising:
a stand supported on an installation surface at a first end thereof;
a plurality of hinges at an end of the stand opposite the first end, the hinges being axially parallel with the stand; and
a plurality of supporting arms respectively coupled to the hinges to pivot thereon parallel to the installation surface, the supporting arms respectively receiving the monitor main bodies at corresponding distal ends thereof.

50. An apparatus to support a plurality of monitor main bodies comprising:
a stand supported on an installation surface;
a plurality of supporting arms selectively attachable to the stand to pivotally support the monitor main bodies thereon;
a conduit within the stand and the supporting arms to receive electrical conductors therein; and
at least one cable routed to a corresponding one of the monitor main bodies through the conduit.

* * * * *